US007843861B2

(12) United States Patent
Dawson et al.

(10) Patent No.: US 7,843,861 B2
(45) Date of Patent: Nov. 30, 2010

(54) COALITION FORMATION AND SERVICE PROVISIONING OF BANDWIDTH SHARING AD HOC NETWORKS

(75) Inventors: Christopher J. Dawson, Arlington, VA (US); Peter G. Finn, Brampton (CA); Rick A. Hamilton, II, Charlottesville, VA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/755,778

(22) Filed: May 31, 2007

(65) Prior Publication Data

US 2008/0298283 A1 Dec. 4, 2008

(51) Int. Cl.
 *H04B 7/00* (2006.01)
(52) U.S. Cl. .................................. 370/310; 455/456.1
(58) Field of Classification Search ......... 370/310–350; 455/456.1
 See application file for complete search history.

(56) References Cited

U.S. PATENT DOCUMENTS

| 5,490,201 | A | 2/1996 | Moberg et al. |
| 6,006,084 | A | 12/1999 | Miller et al. |
| 6,035,281 | A | 3/2000 | Crosskey et al. |
| 6,047,268 | A | 4/2000 | Bartoli et al. |
| 6,366,907 | B1 | 4/2002 | Fanning et al. |
| 6,396,805 | B2 * | 5/2002 | Romrell ...................... 370/216 |
| 6,397,061 | B1 | 5/2002 | Jordan et al. |
| 6,522,735 | B1 | 2/2003 | Fortman et al. |
| 6,653,933 | B2 | 11/2003 | Raschke et al. |
| 6,751,196 | B1 | 6/2004 | Hulyalkar et al. |
| 6,763,248 | B1 | 7/2004 | Odamura |
| 6,810,428 | B1 | 10/2004 | Larsen et al. |
| 6,850,764 | B1 | 2/2005 | Patel |
| 6,941,378 | B2 | 9/2005 | Apostolopoulos et al. |
| 6,954,616 | B2 | 10/2005 | Liang et al. |
| 6,954,790 | B2 | 10/2005 | Forslöw |
| 6,961,575 | B2 | 11/2005 | Stanforth |
| 6,975,613 | B1 | 12/2005 | Johansson |

(Continued)

FOREIGN PATENT DOCUMENTS

EP     0999662    5/2005

(Continued)

OTHER PUBLICATIONS

Non-final Office Action dated Dec. 23, 2008 in U.S. Appl. No. 11/755,806.

(Continued)

*Primary Examiner*—Kent Chang
*Assistant Examiner*—Kashif Siddiqui
(74) *Attorney, Agent, or Firm*—William Schiesser; Roberts Mlotkowski Safran & Cole, P.C.

(57) ABSTRACT

Method, system, and computer program product for enabling dynamic creation of a coalition of multiplexed ad hoc networks to form larger ad hoc networks for service provisioning, in which multiplexers can be connected together in either a hierarchical structure or a parallel structure. Includes method, system, and computer program product for forming an ad hoc network composed of a multiplexer coupling a borrower to at least one lender and forming a coalition composed of the ad hoc network and at least one other multiplexer.

38 Claims, 6 Drawing Sheets

U.S. PATENT DOCUMENTS

| | | | |
|---|---|---|---|
| 6,980,511 B1 | 12/2005 | Li | |
| 6,990,113 B1 | 1/2006 | Wang et al. | |
| 7,016,375 B1 | 3/2006 | Rosenberg et al. | |
| 7,028,096 B1* | 4/2006 | Lee | 709/231 |
| 7,043,225 B1 | 5/2006 | Patel et al. | |
| 7,058,014 B2 | 6/2006 | Sim | |
| 7,058,387 B2 | 6/2006 | Kumar et al. | |
| 7,065,367 B2 | 6/2006 | Michaelis et al. | |
| 7,075,890 B2 | 7/2006 | Ozer et al. | |
| 7,089,301 B1 | 8/2006 | Labio et al. | |
| 7,130,283 B2 | 10/2006 | Vogel et al. | |
| 7,174,385 B2 | 2/2007 | Li | |
| 7,224,964 B2 | 5/2007 | Souissi et al. | |
| 7,240,015 B1 | 7/2007 | Karmouch et al. | |
| 7,257,632 B2 | 8/2007 | Zhang et al. | |
| 7,274,658 B2 | 9/2007 | Bornstein et al. | |
| 7,310,641 B2 | 12/2007 | Moore et al. | |
| 7,340,759 B1 | 3/2008 | Rodriguez | |
| 7,376,747 B2 | 5/2008 | Hartop | |
| 7,401,153 B2 | 7/2008 | Traversat et al. | |
| 7,440,573 B2 | 10/2008 | Lor et al. | |
| 7,447,656 B2 | 11/2008 | Parthasarathy | |
| 7,450,517 B2* | 11/2008 | Cho | 370/238 |
| 7,450,949 B2 | 11/2008 | Choksi | |
| 7,460,549 B1 | 12/2008 | Cardei et al. | |
| 7,463,890 B2 | 12/2008 | Herz | |
| 7,489,656 B2 | 2/2009 | Guo et al. | |
| 7,546,342 B2 | 6/2009 | Li et al. | |
| 7,593,333 B2 | 9/2009 | Li et al. | |
| 2001/0029182 A1 | 10/2001 | McCann et al. | |
| 2002/0053033 A1 | 5/2002 | Cooper et al. | |
| 2002/0053082 A1 | 5/2002 | Weaver et al. | |
| 2002/0058499 A1 | 5/2002 | Ortiz | |
| 2002/0069278 A1 | 6/2002 | Forslöw | |
| 2002/0102987 A1 | 8/2002 | Souisse et al. | |
| 2002/0110110 A1 | 8/2002 | Tiihonen et al. | |
| 2002/0120873 A1 | 8/2002 | Salmivalli | |
| 2002/0122410 A1* | 9/2002 | Kulikov et al. | 370/349 |
| 2002/0141358 A1 | 10/2002 | Requena | |
| 2002/0145978 A1 | 10/2002 | Batsell et al. | |
| 2003/0068975 A1 | 4/2003 | Qiao et al. | |
| 2003/0117978 A1* | 6/2003 | Haddad | 370/331 |
| 2003/0120594 A1 | 6/2003 | Shaginaw et al. | |
| 2003/0137976 A1 | 7/2003 | Zhu et al. | |
| 2003/0139180 A1 | 7/2003 | McIntosh et al. | |
| 2003/0153338 A1 | 8/2003 | Herz et al. | |
| 2003/0235174 A1* | 12/2003 | Pichna et al. | 370/338 |
| 2004/0006621 A1 | 1/2004 | Bellinson et al. | |
| 2004/0029553 A1 | 2/2004 | Cain | |
| 2004/0064351 A1 | 4/2004 | Mikurak | |
| 2004/0128231 A1 | 7/2004 | Morita | |
| 2004/0156312 A1 | 8/2004 | Salonidis et al. | |
| 2004/0162871 A1 | 8/2004 | Pabla et al. | |
| 2004/0165548 A1* | 8/2004 | Backes | 370/328 |
| 2004/0185777 A1 | 9/2004 | Bryson | |
| 2004/0192204 A1 | 9/2004 | Periyalwar et al. | |
| 2004/0260808 A1 | 12/2004 | Strutt | |
| 2004/0264466 A1 | 12/2004 | Huang | |
| 2005/0080872 A1 | 4/2005 | Davis et al. | |
| 2005/0153725 A1 | 7/2005 | Naghian et al. | |
| 2005/0157661 A1* | 7/2005 | Cho | 370/254 |
| 2005/0169209 A1 | 8/2005 | Miu et al. | |
| 2005/0169257 A1 | 8/2005 | Lahetkangas et al. | |
| 2005/0193221 A1 | 9/2005 | Yoneyama | |
| 2005/0203834 A1 | 9/2005 | Prieston | |
| 2005/0213503 A1 | 9/2005 | Guo et al. | |
| 2006/0002326 A1 | 1/2006 | Vesuna | |
| 2006/0085543 A1 | 4/2006 | Hrastar et al. | |
| 2006/0095582 A1 | 5/2006 | Nitya et al. | |
| 2006/0114853 A1* | 6/2006 | Hasty et al. | 370/329 |
| 2006/0126504 A1 | 6/2006 | Meier et al. | |
| 2006/0167784 A1 | 7/2006 | Hoffberg | |
| 2006/0176829 A1 | 8/2006 | McLaughlin et al. | |
| 2006/0179143 A1 | 8/2006 | Walker et al. | |
| 2006/0187858 A1 | 8/2006 | Kenichi et al. | |
| 2006/0193295 A1 | 8/2006 | White et al. | |
| 2006/0224502 A1 | 10/2006 | McGowan | |
| 2007/0005797 A1 | 1/2007 | Fontijn et al. | |
| 2008/0040481 A1 | 2/2008 | Joshi et al. | |
| 2008/0167982 A1 | 7/2008 | Leo et al. | |

FOREIGN PATENT DOCUMENTS

| | | |
|---|---|---|
| WO | 9915960 | 4/1999 |
| WO | 03037009 | 5/2003 |
| WO | 04001585 | 12/2003 |
| WO | 2006004628 | 1/2006 |

OTHER PUBLICATIONS

Final Office Action dated Jun. 3, 2009 in U.S. Appl. No. 11/755,806.
Final Office Action dated Jun. 9, 2009 in U.S. Appl. No. 11/755,806.
Non-final Office Action dated Oct. 19, 2009 in U.S. Appl. No. 11/755,788.
Qui et al.. "Bandwidth in Ad Hoc Networks: A Price-Based Approach," 2003, IEEE, pp. 1-10.
Non-final Office Action dated Nov. 25, 2009 in U.S. Appl. No. 11/755,780.
Non-final Office Action dated Nov. 25, 2009 in U.S. Appl. 11/755,802.
Non-final Office Action dated Dec. 24, 2009 in U.S. Appl. No. 11/755,776.
Non-final Office Action dated Jan. 21, 2010 in U.S. Appl. No. 11/755,808.
Luo, Haiyun, Ramachandran Ramjee, Prasun Sinha, Li (Erran) Li, and Songwu Lu. "UCAN: A Unified Cellular and Ad-Hoc Network Architecture." MobiCom '03, Proceedings of the 9th Annual International Conference on Mobile Computing and Networking. New York, NY, USA: ACM Press, 2003, pp. 353-367.
Non-Final Office Action dated Mar. 4, 2010 in U.S. Appl. No. 11/755,775.
Final Office Action dated Mar. 5, 2010 in U.S. Appl. No. 11/755,788.
Non-Final Office Action dated Mar. 22, 2010 in U.S. Appl. No. 11/755,782.
Non-Final Office Action dated Mar. 18, 2010 in U.S. Appl. No. 11/755,763.
Non-Final Office Action dated Jan. 25, 2010 in U.S. Appl. No. 11/755,771.
D. Zhu et al., "QoS Aware Wireless Bandwidth Aggregation (QAWBA) by Integrating Cellular and Ad-hoc Networks." Oct. 2004.
D. Zhu et al., "Using Cooperative Multiple Paths to Reduce File Download Latency in Cellular Data Networks." Nov. 2005.
Office Action dated Jun. 4, 2010 in U.S. Appl. No. 11/755,780.
Office Action dated Jun. 22, 2010 in U.S. Appl. No. 11/755,776.
Office Action dated Jul. 12, 2010 in U.S. Appl. No. 11/755,808.
Notice of Allowance dated Jun. 9, 2010 in U.S. Appl. No. 11/755,802.
Notice of Allowance dated Jun. 28, 2010 in U.S. Appl. No. 11/755,771.
Notice of Allowance dated Aug. 16, 2010 in U.S. Appl. No. 11/755,763.
Notice of Allowance dated Aug. 25, 2010 in U.S. Appl. No. 11/755,780.
Office Action dated Sep. 14, 2010 in U.S. Appl. No. 11/755,788.
Office Action dated Sep. 15, 2010 in U.S. Appl. No. 11/755,782.
Notice of Allowance dated Oct. 12, 2010 in U.S. Appl. No. 11/755,808.

* cited by examiner

| Node Name | Node Type | Location | File Requested for Transfer | Price | Service Level Objective | Current Quality of Service |
|---|---|---|---|---|---|---|
| | | | | | | |
| | | | | | | |

COALITION FORMATION AND SERVICE PROVISIONING OF BANDWIDTH SHARING AD HOC NETWORKS

CROSS-REFERENCE TO RELATED APPLICATIONS

This application is related to the following copending applications, all of which are incorporated herein by reference in their entireties: Copending application Ser. No. 11/755,808, published as U.S. Pub. No. 2008/0299988; copending application Ser. No. 11/755,780, published as U.S. Pub. No. 2008/0298327; and copending application Ser. No. 11/755,775, published as U.S. Pub. No. 2008/0301017.

FIELD OF THE INVENTION

The invention generally relates to systems and processes for enabling dynamic creation of a coalition of multiplexed ad hoc networks to form larger ad hoc networks for service provisioning. The multiplexers can be connected together in either a hierarchical structure or a parallel structure.

BACKGROUND OF THE INVENTION

Mobile computing is becoming increasingly pervasive, and will approach ubiquity in wireless devices (e.g., notebook computers, smart phones, personal digital assistants (PDAs), etc.) over the next decade. One consistent trend in this mobile computing space is the fact that such platforms increasingly communicate over a variety of wireless protocols. Common protocols in use today for wireless data transfer include EV-DO, IEEE 802.11a/b/g, ZigBee® (registered trademark of ZIGBEE ALLIANCE in the United States, other countries, or both), Bluetooth® (registered trademark of BLUETOOTH SIG, INC. in the United States, other countries, or both), and many other related protocols. By their very nature, differentials do exist, and will continue to exist, between the speed, or bandwidth, with which mobile devices can communicate with each other, vis-à-vis communications speeds with the broader network where a device's target data may reside.

It is often the case that a wireless device will have a relatively fast wireless connection to other local devices and a relatively slow wireless connection to the broader network (e.g., the Internet). For example, local wireless connections, provided by protocols such as IEEE 802.11a, 802.11b, 802.11g, 802.15.1 (e.g., Bluetooth®), and 802.15.4 (e.g., Zigbee®) provide fast data transfer rates of about 3 to 54 megabits per second (Mbps). However, such transfer protocols often have a limited maximum transmission range of about 30 to 300 ft. On the other hand, wireless telephony protocols (e.g., EV-DO, CDMA, EDGE, GPRS, etc.) have relatively large maximum transmission ranges on the order of miles, but only provide data transfer rates of about 10 kilobits per second (kbps) to 1 Mbps. Thus, while a user of a mobile device may enjoy relatively fast data transfer amongst local devices, the user is often limited to a slow wireless connection to the outside world (e.g., the Internet).

Accordingly, there exists a need in the art to overcome the deficiencies and limitations described hereinabove.

SUMMARY OF THE INVENTION

In a first aspect of the invention, a method includes forming an ad hoc network composed of a multiplexer coupling a borrower to at least one lender and forming a coalition composed of the ad hoc network and at least one other multiplexer.

In another aspect of the invention, a system is provided having an ad hoc network composed of a multiplexer coupling a borrower to at least one lender and at least one other multiplexer coupled to the ad hoc network to share bandwidth.

In another aspect of the invention, the system includes a server having a database containing data associated with one or more instructions for implementing a coalition formation in an ad-hoc network, and at least one of a hardware and software component for selecting at least one multiplexer having available bandwidth and for forming the coalition with the at least one multiplexer having available bandwidth and the ad-hoc network composed of a requesting multiplexer coupling a borrower of bandwidth to at least one lender.

In another aspect of the invention, a method a computer infrastructure operable to identify at least one multiplexer having additional bandwidth to share with an ad hoc network composed of a requesting multiplexer coupling a borrower to at least one lender, select at least one of the at least one multiplexers having available bandwidth to form a coalition with the ad hoc network, and assign at least a portion of a task requested by the borrower to the selected at least one multiplexer having available bandwidth.

In another aspect of the invention, a computer program product comprises a computer usable medium having readable program code embodied in the medium and includes at least one component to create an ad hoc network composed of a multiplexer coupling a borrower to at least one lender, and form a coalition in which at least one other multiplexer is coupled to the ad hoc network to share bandwidth.

BRIEF DESCRIPTION OF THE DRAWINGS

FIG. 3 is an overview for initiating an ad hoc network;

DETAILED DESCRIPTION OF EMBODIMENTS OF THE INVENTION

The present invention is directed to processes and systems for enabling dynamic creation of a coalition of multiplexed ad hoc networks to form larger ad hoc networks for service provisioning. The multiplexers, e.g., multiplexers of at least one lender having available bandwidth, can be connected together in either a hierarchical structure or a parallel structure. The invention focuses on the quality of service agreed upon between the multiplexer and the borrower, such that, when the multiplexer detects a situation that may reduce the quality of service offered to the borrower to a level below a predefined minimum, the multiplexer can create a faster pipe to address this reduction in quality of service by forming a coalition with at least one multiplexer having available bandwidth to share.

Thus, the invention provides a system and method to allow dynamic creation of a coalition of multiplexed ad hoc networks to form a bigger ad hoc network for the purpose of service provisioning. In this regard, in a wireless ad hoc network with a multiplexed gateway, the multiplexer is responsible for joining together a borrower who requests for bandwidth sharing and lenders who are willing to share their bandwidth to form a big fat pipe. However, through a service agreement or contract, a borrower may impose a minimum quality of service requirement on the ad hoc network's performance, whereby the multiplexer is responsible for maintaining the required quality of service in order to maintain an acceptable customer satisfaction level.

System Environment

Figure 1:
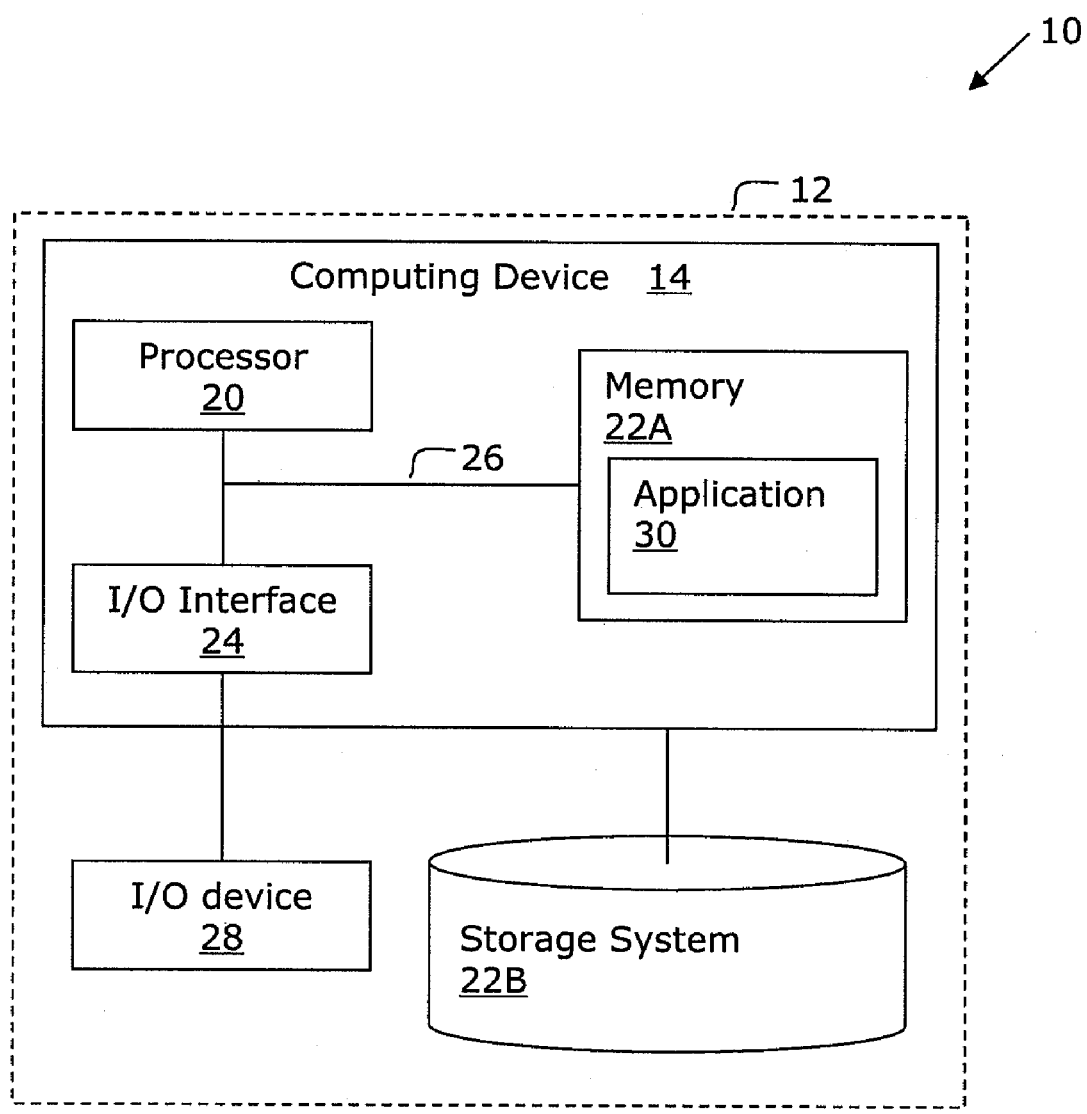
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to permit compensation schemes between borrowers, or their service providers, and lenders, or their service providers, for borrowed bandwidth within an ad hoc network, in accordance with the invention, e.g., process described herein. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

General Overview of Embodiments

"Ad hoc" relationships will become increasingly important in the communal sharing of immediately available resources, and most particularly, the sharing of bandwidth. With the creation of peer-to-peer networks and torrent type services a file may be stored in a large number of locations to allow very fast download of the file in sections simultaneously from multiple locations. Groups of devices may congregate, or coexist, in one place and each may have limited bandwidth to the outside world. However, the groups of devices may have high bandwidth to other devices within close proximity. An example of this is a 802.11g local area connection that creates a high-speed wireless connection between two cellular phone devices within close range (high bandwidth), and wherein the cellular phones' cellular connection may provide bandwidth at less than $\frac{1}{100}^{th}$ of the 802.11 connection.

The present invention is directed to systems and methods by which a borrower of bandwidth, or a multiplexer that connects to the borrower, in an ad hoc network selects lenders of bandwidth in an effort to optimize the cost of services, time of upload/download, etc. The specific pricing mechanisms which can be implemented with the invention are disclosed in the following applications, all which are hereby incorporated by reference in their entirety. For example, the negotiation and acceptance of agreed pricing, and the formation and rearrangement of the bandwidth sharing ad hoc networks is set forth in co-pending application Ser. No. 11/755,775. The negotiation and acceptance of agreed pricing, and the formation and rearrangement of lending devices that perform multiplexing functions is set forth in co-pending application Ser. No. 11/755,779. Price offerings are set forth in co-pending application Ser. No. 11/755,782. Market price offerings are set forth in co-pending application Ser. No. 11/755,800.

To access a wireless network, a user needs an access point connection, e.g., a wireless router, hot spot, wireless connection port. However, when a user is not in the vicinity of such an access point connection, various devices, e.g., cell phones, can be used to provide a connection to a wireless network, but the bandwidth may be limited, i.e., not sufficient to enable fast exchanges, e.g., uploads, downloads, etc. Thus, through the ad hoc network the user or borrower can use unused bandwidth of others or lenders to partition tasks and speed up transmission, thereby reducing wait time.

General Overview of Ad Hoc Networks

In order to utilize compensation mechanisms for sharing bandwidth, an ad hoc network may be created between a borrower node and one or more lender nodes, and a compensation scheme for the shared bandwidth may be established. This process may include both an initial discovery mechanism of the proposed role each node may play, and a negotiation and acceptance of the agreed compensation scheme.

Figure 2:
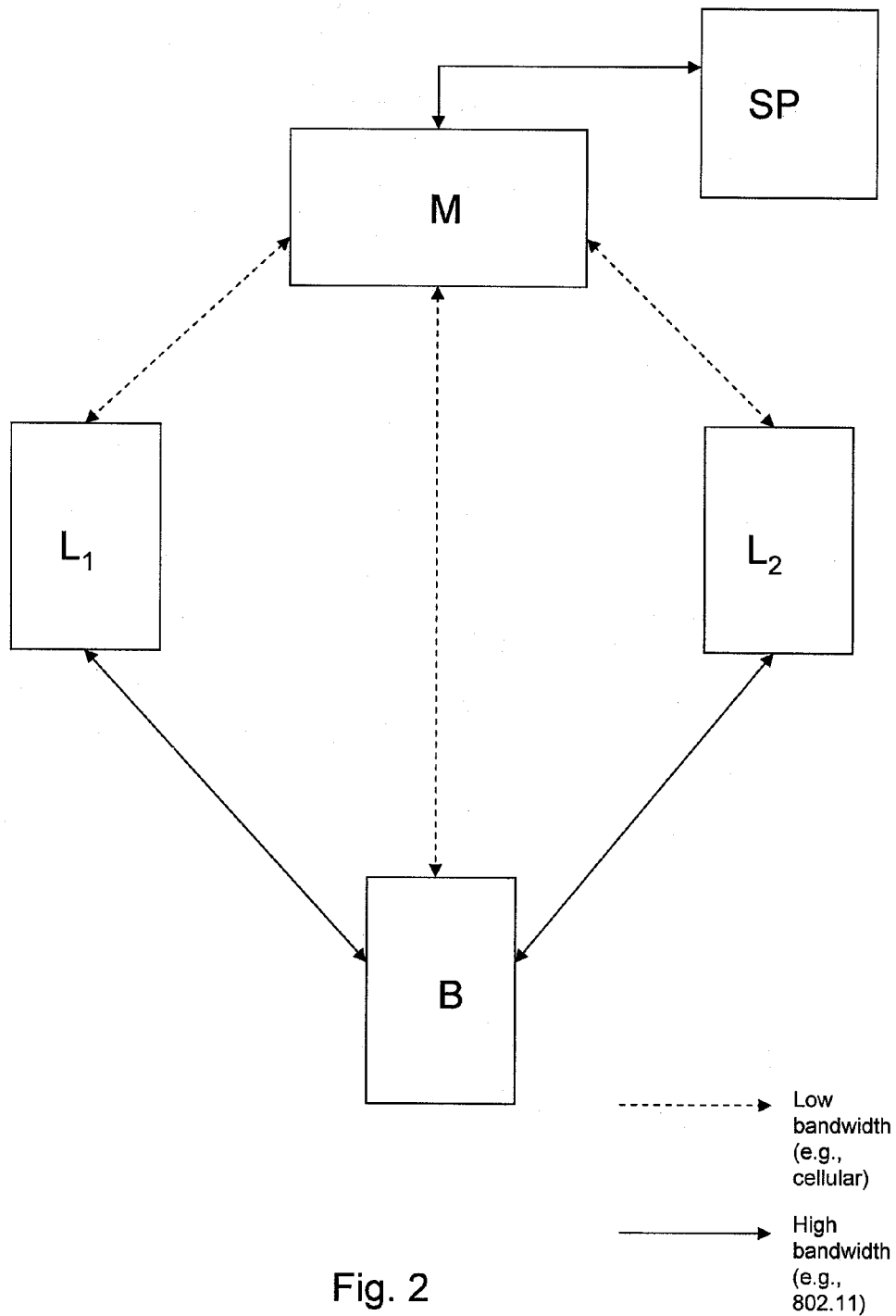
FIG. 2 is an overview of a multiplexed gateway bandwidth bandwidth-sharing ad hoc network.

FIG. 2 is a general overview of a multiplexed gateway bandwidth sharing architecture which may be implemented with the invention. An illustrative multiplexed gateway bandwidth sharing architecture is set forth in co-pending application Ser. No. 11/755,780. In this implementation, a borrower B will request a multiplexer M to set up an ad-hoc network. The multiplexer M may communicate with a service provider SP and connect to one or more lenders, L.sub.1 and L.sub.2, via a wireless network. Once a network is established, the multiplexer will manage the network, including the bandwidth allocations provided by each of the lenders, for example.

Initial Formation of the Ad Hoc Network

In a selected gateway environment, in order to form a new ad hoc network, a borrower may scan for any and/or all available potential lenders and the borrower or the multiplexer can prioritize the potential lenders for data transfer. The formation of the ad hoc network, in embodiments, may use a "borrower/lender" table as shown in FIG. 3. In this example, the borrower or gateway (e.g., multiplexer) can broadcast the table to potential lenders which, in turn, can return the table, with information pertinent to the lender, to the borrower or the gateway. Using this information, the borrower or lender can establish an ad hoc network with lenders that meet certain criteria, e.g., reliability, speed, availability and/or costs.

In the borrower/lender table of FIG. 3, the "Node Name" column may be the unique identifier of a node such as the borrower and lenders. For example, this could be a hostname, a Bluetooth® name or any other information that can uniquely describe the node. The "Node Type" column may describe whether this node is a borrower, a lender, or a gateway. The "Location" column may be an IP address, Wi-Fi address, Bluetooth address, MAC address or any other attribute that can be used to locate the node. The "File Requested for Transfer" column may be used to store information about the file (or piece of file) to be transferred. This may be an HTTP address, an FTP address or other information to describe where the data is to be found. The "Service Level Objective" column may describe the negotiated service levels of the node. For example, the requested bandwidth, the availability of the node, reliability and so forth. The "Current Quality of Service" column may contain the current quality of service (QoS) of the node. The QoS information may contain a status of the node, e.g., how well the service levels are being met, the current transfer rate, or the current progress of the file download.

The "Price" column may be a price set by the lender to use the lender's bandwidth. The price may be stated in a price/data volume, a price/time, a price/data volume and a price/time, a price/time with a data cap, or a one-time price. Additionally the price may be stated as a number of minutes to be used in a wireless service plan or any other charging mechanism.

In aspects of the invention, a borrower and a lender may not see all of the table on their respective devices, and some of the table information may be generated automatically. The user interface may require less display space and may require less user input. For example, the location of a lender's device or borrower's device may be known by the device itself. Thus, the user may not need to complete this portion of the table. Rather, the information for that portion of the table would be automatically completed by the device. Furthermore, the automatic generation of the information in the table may also apply to the Node Type, Node Name, Service Level Objective, Price and Current Quality of Service columns. For example, a borrower may have preset levels of service level objectives that they require whenever they borrow bandwidth, so that generation of the Service Level Objective column may be performed automatically by the borrower's device. Additionally, a potential lender may have a set price for lending bandwidth already input into their device, such that the Price column information is automatically generated.

In one illustrative example, a borrower may initially generate the table by clicking on an icon, and when prompted, input the File Requested for Download information. The borrower's device could generate the remaining portions of the information in the table. When a potential lender receives the borrower's request, their device may simply prompt for a decision to be a lender. If the potential lender answers "yes", then their device may prompt the potential lender for a price. As set forth above, the rest of the information in the table may be generated automatically. Illustrative cases of formation and rearrangement of a bandwidth-sharing ad hoc network architecture are set forth in co-pending application Ser. No. 11/755,775.

Flow Diagrams

The flow diagrams described herein may be implemented in environments that enable the borrower to select lender's bandwidth based upon optimization criteria. By way of example, the flow diagrams can be implemented in the environment of FIG. 1 to provide instructions for selecting one or more lenders' bandwidth in an ad hoc network and/or may be implemented in the environment of FIG. 2 to provide instructions for selecting one or more lenders' bandwidth in the multiplexed gateway bandwidth sharing architecture. In the various disclosed exemplary embodiments, described below, a bandwidth sharing agreement may be reached on data, quality of service (QoS) and associated costs. This agreement may include compensation instructions for compensating one or more lender of bandwidth in the ad hoc network.

The flow diagrams may represent a high-level block diagram of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 4:
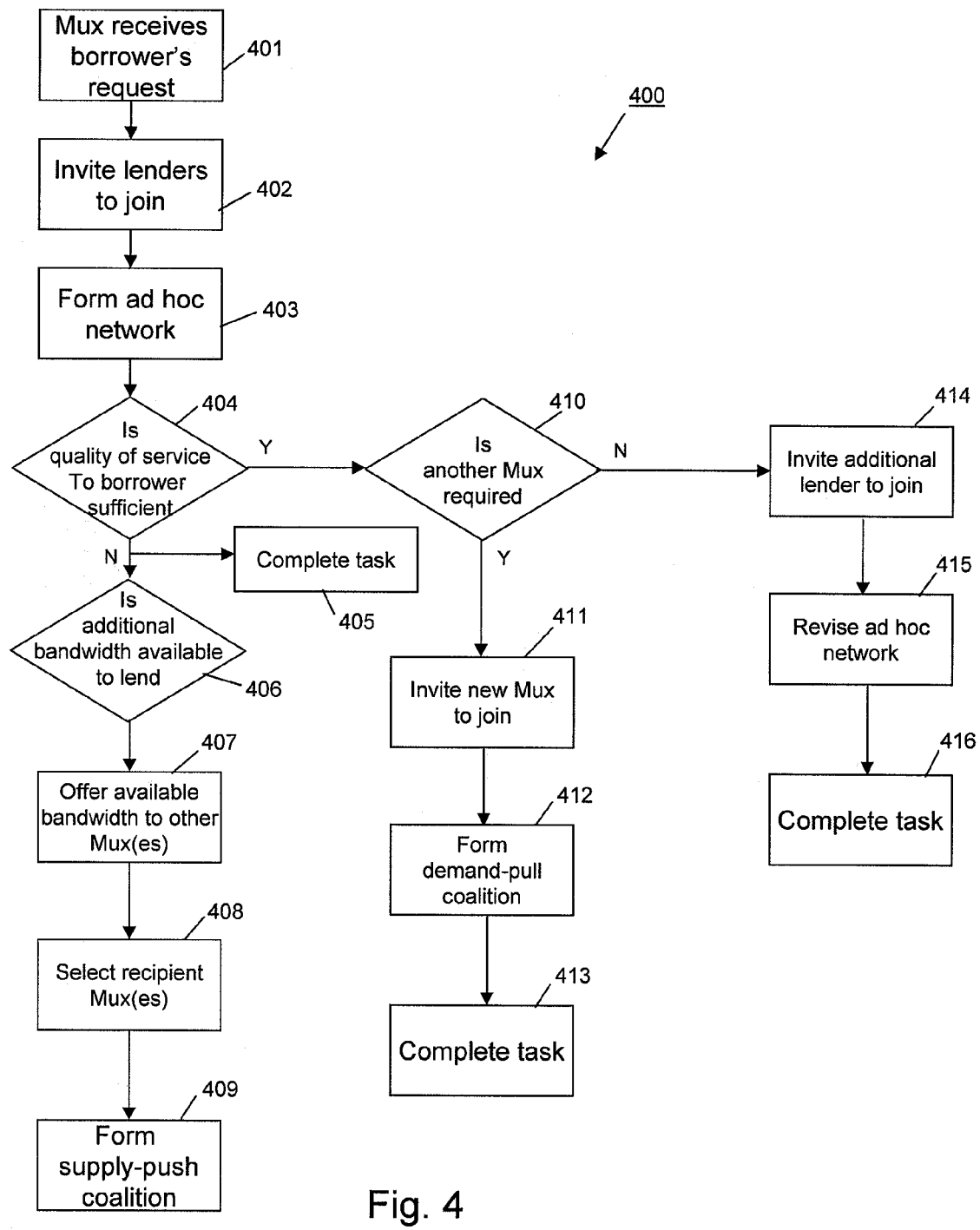
FIG. 4 is a flow diagram for generally implementing the invention.

By way of non-limiting example, FIG. 4 illustrates a flow diagram 400 of a process for dynamic creation of a coalition of multiplexed ad hoc networks. It is understood that this and all other illustrated examples are provided to facilitate explanation of the invention, but are not to be construed as limiting, such that other flow diagrams and/or processes for creating coalitions of multiplexed networks in accordance with the features of the invention are within the scope of the instant invention.

As shown, a multiplexer, at step 401, receives a borrower's request to complete a task, e.g., a download or upload of one or more files, through an ad hoc network composed of lenders with available bandwidth coupled to the multiplexer. To qualify to be a multiplexer, the device needs to have high speed connection to the internet. Moreover, as the multiplexer is acting as a gateway, any service request from the borrower will be routed via the multiplexer. In this regard, the bandwidth between the multiplexer and the internet is bounded by the maximum speed of the multiplexer, and the connection between the borrower and the multiplexer is restricted by the aggregated connection bandwidth from all the lenders. By way of example, when lenders operate as expected, the borrower can assume the download speed is equivalent to that offered by the multiplexer, i.e., if the aggregated bandwidth from the lenders is very close to the bandwidth of the multiplexer. The multiplexer can invite lenders, e.g., from a list of lenders having available bandwidth, to join the ad hoc network at step 402. At step 403, the ad hoc network is formed with the selected lenders being coupled to the borrower through the multiplexer.

As part of a service agreement or contract, a borrower may impose a minimum quality of service requirement on the ad hoc network's performance, such that the multiplexer may be responsible for maintaining the required quality of service in order to maintain an acceptable customer satisfaction level. Accordingly, at step 404, a determination is made whether the quality of service supplied to the borrower is sufficient. By way of further example, it is possible one or more lenders within the ad hoc network may not be able to perform as promised, e.g., lenders may drop off from the connection. All these can jeopardize the expected quality of service offered by the multiplexer to the borrower, and situations such as can motivate the multiplexer to seek help from other multiplexers and/or lenders in order to maintain the level of quality of service. If sufficient, the task is assigned to the ad hoc network to begin the uploading/downloading of the borrower's file(s) at step 405.

While the ad hoc network is working on the borrower's task, the multiplexer can determine, at step 406, whether sufficient bandwidth is available to offer to other multiplexers seeking bandwidth. If such additional bandwidth is available, the multiplexer can offer this available bandwidth to other multiplexers seeking bandwidth at step 407. From the other multiplexers requesting the available bandwidth, the multiplexer selects a recipient multiplexer to receive the additional bandwidth at step 408, and a coalition network is formed at step 409 between the ad hoc network and the recipient multiplexer. It is not necessary that the ad hoc network be currently working on the borrower's task when the determination of available bandwidth is made. That is, after completion of the borrower's task, the multiplexer can assess whether it has bandwidth available for other multiplexers.

Steps 406-408 relate to a multiplexer willing to share bandwidth to initiate at step 409 a coalition, which can be referred to as a "supply push" scenario. As noted above, the bandwidth-sharing multiplexer looks up available multiplexers via a service directory, and broadcasts a message to all available multiplexers regarding the offered extra bandwidth. The bandwidth-sharing multiplexer receives responses from other multiplexers, i.e., potential bandwidth buyers, and selects one or multiple buyers based on its selection criteria. The bandwidth-sharing multiplexer can then approach the selected multiplexers to give terms and conditions of the deal. Once there is a mutual agreement on the deal, a coalition is formed, and the bandwidth-sharing multiplexer can wait for the selected multiplexers to send tasks and instructions.

When step 404 determines the quality of service provided to the borrower is not sufficient, a determination is made at step 410 whether another multiplexer is required to enhance the quality of the service by the ad hoc network to the borrower. In the exemplary embodiment, the multiplexer may utilize decision making algorithms or policies to detect, e.g., automatically, whether the multiplexer needs to form coalition with other multiplexers. By way of example, the following situations may inform the multiplexer the quality of service to the borrower is insufficient: Bandwidth usage of the aggregated bandwidth in the network is higher than a certain percent (need more bandwidth); bandwidth of the multiplexer exceeds the aggregated bandwidth of the lenders in the network by a certain amount or ratio; individual lenders are not able to perform as promised; individual lenders have to drop off from their connections before their download tasks are completed; and/or the borrower has broadcast an urgent message to the multiplexer to expedite the completion of the download due to emergency.

If another multiplexer is required, other multiplexers having available bandwidth are invited to join the ad hoc network at step 411. By way of example, the new multiplexer may be responsible for finding its own circle of lenders, if it has not already done so, and can be capable of delivering the requisite level of the quality of service demanded by the requesting multiplexer. The multiplexer at step 412 selects at least one of the other multiplexers and forms a coalition network, and assigns tasks to the selected at least one bandwidth-sharing multiplexer. At step 413, the coalition network completes the borrower's task.

Steps 410-413 relate to a multiplexer demanding extra bandwidth to initiate the coalition, which can be referred to as a "demand pull" scenario. As described above, the requesting multiplexer can look up available multiplexers via a service directory, and select a list of multiplexers based on selection criteria. The requesting multiplexer may broadcast a message to these multiplexers requesting extra bandwidth with the specific tasks that indicates the number of tasks, and can receive responses from multiplexers who are interested supplying bandwidth, which indicates the sharing terms and conditions. The requesting multiplexer can make a decision on picking a number of multiplexers willing to supply the bandwidth based on some selection criteria or algorithm, and can send a response to each multiplexer confirming the agreement. Once the coalition is formed, the requesting multiplexer can assign tasks with the instructions to the bandwidth sharing multiplexers.

When at step 410 it is determined that another multiplexer is not necessary to improve the quality of service of the ad hoc network to the borrower, the multiplexer can invite additional lenders to join the network at step 414. For example, the multiplexer can add enough new lenders to the existing ad hoc network in order to aggregate more bandwidth and to enhance service quality. From the additional lenders, the multiplexer can select one or more of the additional lenders to join the ad hoc network at step 415, and thereafter, the borrower's task is completed by the new ad hoc network at step 416.

Figure 5:
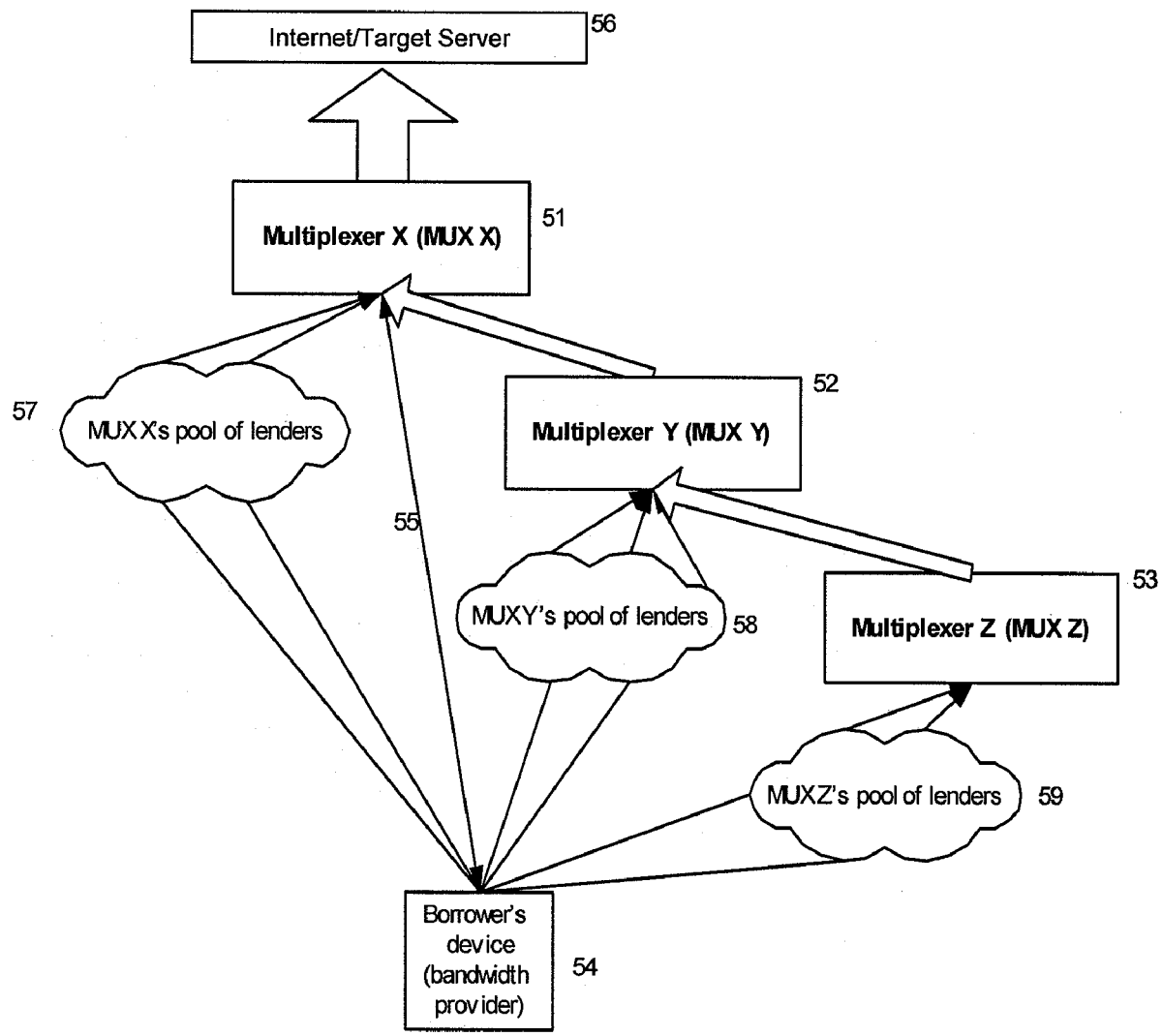
FIG. 5 is a block diagram for a hierarchical structured coalition.

The coalitions can be formed in either a hierarchical structure or a parallel structure. FIG. 5 illustrates a hierarchical structured coalition, where multiple multiplexers, e.g., MUX X 51, MUX Y 52, and MUX Z 53, can be joined in a parent and child relationship. In the illustrated embodiment, MUX X 51 represents the requesting multiplexer, and therefore communicates with borrower's device 54 through communication channel 55. As discussed above, MUX X 51 forms an ad hoc network to couple borrower's device 54 to the Internet or a target server 56 through MUX X's pool of lenders 57. Further, MUX X 51 monitors the quality of service supplied to borrower's device 54, and when the quality of service to borrower's device 54 falls below a satisfactory level according to the service level agreement between the requesting multiplexer and the borrower, MUX X 51 can become a requesting multiplexer seeking assistance from another multiplexer.

MUX X 51 can invite MUX Y 52, an identified bandwidth-sharing multiplexer, to form a coalition, thereby joining the ad hoc network, in order to improve service quality to borrower's device 54. As MUX Y 52 is treated as another lender of MUX X's ad hoc network, MUX X assigns tasks to MUX Y 52. Once it receives the tasks and instructions from MUX X 51, MUX Y 52 can divide the assigned tasks into smaller sub-tasks if necessary, and dispatch the sub-tasks to its pool of lenders 58, which are now joined with borrower's device 54. MUX Y 52 can act as a router and access the Internet or designated server location (target server) via the bandwidth of MUX X 51. Thus, in the hierarchical structure, MUX X 51 is responsible for monitoring the performance of MUX Y 52 just as it monitors the members of its pool of lenders 57. If MUX Y 52 finds that the members of its pool of lenders 58 are not able to perform as promised to MUX X 51, MUX Y 52 can form a coalition with another multiplexer, e.g., MUX Z 53, in the same way as the coalition formed by MUX X 51 with MUX Y 52 to remedy its quality of service. That is, MUX Z 53, an identified bandwidth-sharing multiplexer, and its pool of lenders 59, forms a coalition with MUX Y 52, thereby joining as a lender of MUX Y 52 and receiving tasks and instructions from MUX Y 52. MUX Z 53 can divide the assigned tasks into smaller sub-tasks if necessary, and dispatch the sub-tasks to its pool of lenders 59, which are now joined with borrower's device 54, and can act as a router and access the Internet or designated server location (target server) via the bandwidth of MUX X 51 through the bandwidth of MUX Y 52. In this second coalition, MUX Y 52 is responsible for monitoring the performance of MUX Z 53 just as it monitors the members of its pool of lenders 58. Regardless of the number of multiplexers forming coalitions with requesting multiplexer MUX X 51, MUX X 51 maintains communication channel 55 with borrower's device 54.

Figure 6:
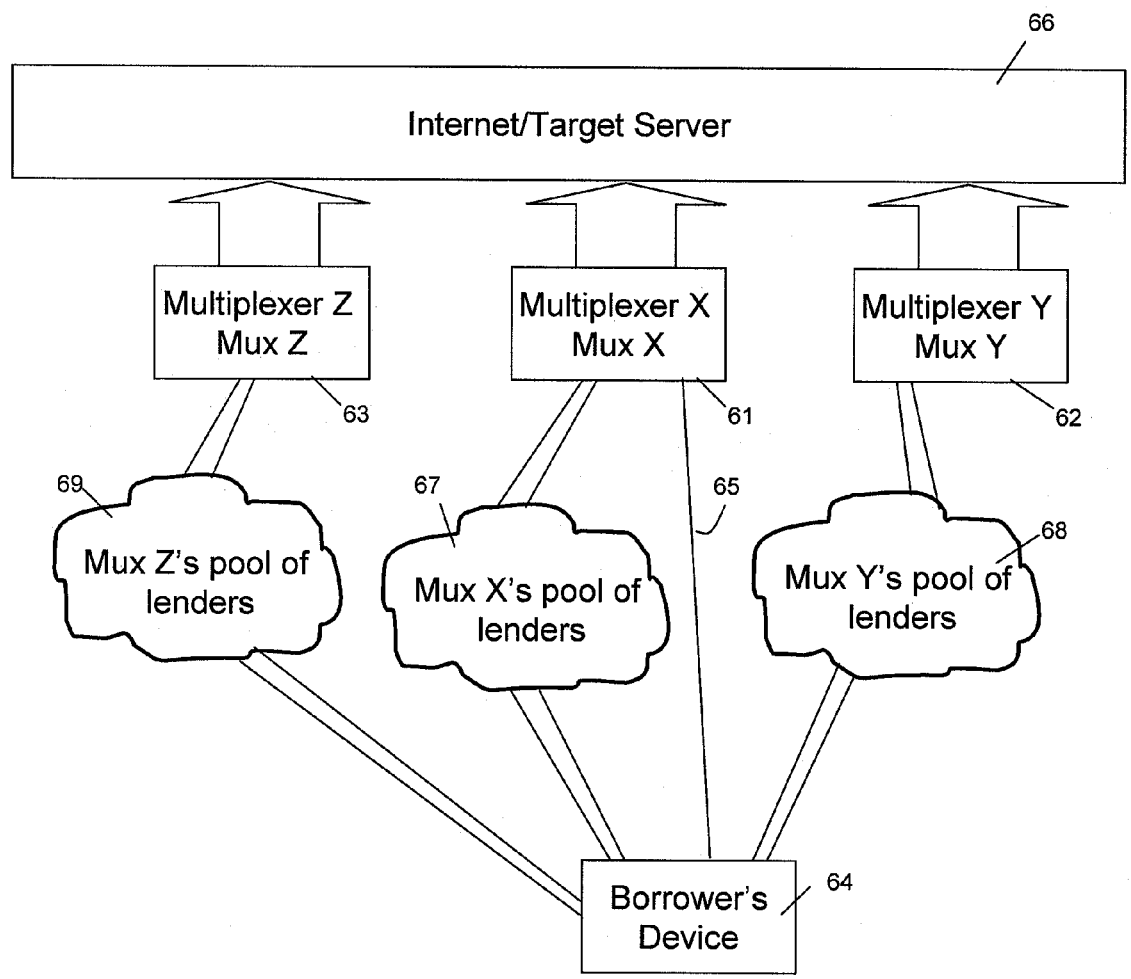
FIG. 6 is a block diagram for a parallel structured coalition.

In contrast, FIG. 6 illustrates an exemplary parallel structured coalition, where multiple multiplexers, e.g., MUX X 61, MUX Y 62, and MUX Z 63, can be joined like a group of partners. In the illustrated embodiment, MUX X 61 represents the requesting multiplexer, and therefore communicates with borrower's device 64 through communication channel 65. MUX X 61 can form an ad hoc network to couple borrower's device 64 to the Internet or a target server 66 through MUX X's pool of lenders 67. Further, MUX X 61 may monitor the quality of service supplied to borrower's device 64, and when the quality of service to borrower's device 64 falls below a satisfactory level, MUX X 61 can become a requesting multiplexer seeking assistance from another multiplexer.

MUX X 61 can invite MUX Y 62 and MUX Z 63, identified bandwidth-sharing multiplexers, to form a coalition, thereby joining the ad hoc network, in order to improve service quality to borrower's device 64. In this manner, MUX X 61, as requesting multiplexer, can assign tasks and instructions to its partners, MUX Y 62 and MUX Z 63, who are willing to share their available bandwidth. However, in contrast to the hierarchical structure depicted in FIG. 5, request originator MUX X 61 does not monitor the performance of MUX Y 62 or MUX Z 63 because MUX Y 62 and MUX Z 63, through their respective pools of lenders 68 and 69, act as gateways to the Internet or the designated server 66. Thus, MUX Y 62 and MUX Z 63 can separately couple borrower's device 64 to the Internet or target server 66 through MUX Y's pool of lenders 68 and through MUX Z's pool of lenders 69. However, like the hierarchical structure, requesting multiplexer MUX X 61 maintains communication with borrower's device 64 through communication channel 65.

With the above-discussed hierarchical and parallel structures, there can be pros and cons in their use in an ad hoc network. In the hierarchical structure, the requesting multiplexer has more control over the other multiplexers since the bandwidth-sharing multiplexers are channeled to the Internet or designated server through the requesting multiplexer. On the other hand, the maximum bandwidth between the multiplexer and the Internet or the designated server remains to the same, because it is limited by the bandwidth of the requesting multiplexer. For the parallel structure, the requesting multiplexer may sacrifice its monitoring capability over the bandwidth-sharing multiplexers (partners) since each partner acts as its own gateway. However, this structure can speed up the downloading time since each multiplexer has its own download channel.

As there may be pros and cons for each structural arrangement, the requesting multiplexer can set up its own rules for its decision. For example, decisions can be made according to the trustworthiness of the bandwidth-sharing multiplexers by reviewing available ratings, e.g., reliability, or by the emergency requests made by the borrower. If the other multiplexers have high trustworthiness ratings, then the requesting multiplexer can form a parallel coalition and rely on these partners to monitor their own tasks. If the borrower has to speed up the download, e.g., in an emergency situation, the requesting multiplexer can advantageously form a parallel coalition.

While the instant invention for optimizing the selection of lenders by a borrower, it is understood that the illustrated examples provided are for the purpose of explanation and are not to be construed as limiting. Thus, it is understood that borrowers may optimize their selection of lenders according to other criteria without departing from the scope of the invention. Further, it is understood that the process discussed with regard to the illustrated examples is likewise provided for ease of explanation, and should not be construed as limiting. Thus, it is understood borrowers may utilize different procedures in optimizing their selection of lenders according to the criteria of the invention without departing from the scope of the invention.

While the invention has been described in terms of embodiments, those skilled in the art will recognize that the invention can be practiced with modifications and in the spirit and scope of the appended claims. For example, while the embodiments have been described with reference to exemplary illustrations and processes, those skilled in the art will recognize that the invention can be practiced with any number of lenders, files, file portions, ISPs, and/or remote locations. Additionally, it should be recognized that a combination of any of the above options may be implemented, where appropriate.

What is claimed:

1. A method, comprising:
   forming an ad hoc network composed of a multiplexer coupling a borrower to at least one lender; and
   forming a coalition composed of the ad hoc network and at least one other multiplexer, wherein:
   the at least one lender comprises a plurality of lenders;
   the plurality of lenders comprises a first subset of the plurality of lenders and a second subset of the plurality of lenders;
   the first subset of the plurality of lenders is associated with the multiplexer;
   the second subset of the plurality of lenders is associated with the at least one other multiplexer;
   the multiplexer comprises a computer device that is separate from the borrower and the plurality of lenders and that communicates with the borrower and the first subset of the plurality of lenders via wireless telephony protocol; and
   the at least one other multiplexer comprises another computer device that is separate from the borrower and the plurality of lenders and that communicates with the second subset of the plurality of lenders via wireless telephony protocol.

2. The method of claim 1, wherein, before forming the coalition, the method further comprises monitoring quality of service to the borrower.

3. The method of claim 2, wherein, when the monitored quality of service to the borrower is below a predefined level, the method further comprises seeking other multiplexers with available bandwidth to join the ad hoc network.

4. The method of claim 2, wherein the monitoring of the quality of service comprises determining whether each lender is adequately performing.

5. The method of claim 3, wherein, after forming the coalition, the at least one other multiplexer selects its own lenders.

6. The method of claim 3, wherein the at least one multiplexer is selected by the multiplexer from a service directory.

7. The method of claim 3, further comprising broadcasting a message to the other multiplexers that comprises at least one of a request for extra bandwidth, identification of specific tasks, and identification of a number of tasks.

8. The method of claim 3, further comprising receiving responses from multiplexers with available bandwidth.

9. The method of claim 3, wherein the multiplexer selects at least one of the other multiplexers.

10. The method of claim 3, wherein the monitoring of quality of service comprises monitoring an occurrence of at least one of: bandwidth usage of the aggregated bandwidth in the network is higher than a certain percent; bandwidth of the multiplexer exceeds the aggregated bandwidth of the lenders in the network by a certain amount or ratio; individual lenders are not able to perform as promised; individual lenders have to drop off from their connections before their download tasks are completed; and an urgent borrower broadcast to the multiplexer to expedite the completion of the download.

11. The method of claim 1, further comprising determining whether the multiplexer has additional bandwidth to share.

12. The method of claim 11, further comprising looking up recipient multiplexers seeking available bandwidth in a service directory.

13. The method of claim 11, further comprising broadcasting a message to the recipient multiplexers about the multiplexer's available bandwidth.

14. The method of claim 11, further comprising receiving responses from the recipient multiplexers and selecting at least one of the recipient multiplexers to use the available bandwidth of the ad hoc network.

15. The method of claim 1, wherein the coalition comprises a hierarchical structure.

16. The method of claim 15, wherein the multiplexer and the at least one other multiplexer are arranged in a parent/child arrangement.

17. The method of claim 15, wherein the at least one other multiplexer accesses the Internet or a designated server through the bandwidth of the multiplexer.

18. The method of claim 15, wherein the multiplexer monitors the performance of the at least one other multiplexer.

19. The method of claim 1, wherein the multiplexer, seeking additional bandwidth, identifies the at least one other multiplexer as having available bandwidth.

20. A system comprising:
    an ad hoc network composed of a multiplexer coupling a borrower to at least one lender; and
    at least one other multiplexer coupled to the ad hoc network to share bandwidth, wherein:
    the at least one lender comprises a plurality of lenders;
    the plurality of lenders comprises a first subset of the plurality of lenders and a second subset of the plurality of lenders;
    the first subset of the plurality of lenders is associated with the multiplexer;
    the second subset of the plurality of lenders is associated with the at least one other multiplexer;
    the multiplexer comprises a computer device that is separate from the borrower and the plurality of lenders and that communicates with the borrower and the first subset of the plurality of lenders via wireless telephony protocol; and
    the at least one other multiplexer comprises another computer device that is separate from the borrower and the plurality of lenders and that communicates with the second subset of the plurality of lenders via wireless telephony protocol.

21. The system in accordance with claim 20, wherein the multiplexer and at least one other multiplexer are arranged in a hierarchical structure.

22. The system in accordance with claim 21, wherein the at least one multiplexer is coupled to at least one of the Internet and a designated server through the bandwidth of the multiplexer.

23. A system comprising:
    a server having a database containing data associated with one or more instructions for implementing a coalition formation in an ad-hoc network; and
    at least one of a hardware and software component for selecting at least one multiplexer having available bandwidth and for forming the coalition with the at least one multiplexer having available bandwidth and the ad-hoc network composed of a requesting multiplexer coupling a borrower of bandwidth to at least one lender, wherein:
    the at least one lender comprises a plurality of lenders;
    the plurality of lenders comprises a first subset of the plurality of lenders and a second subset of the plurality of lenders;
    the first subset of the plurality of lenders is associated with the multiplexer;

the second subset of the plurality of lenders is associated with the at least one other multiplexer;

the multiplexer comprises a computer device that is separate from the borrower and the plurality of lenders and that communicates with the borrower and the first subset of the plurality of lenders via wireless telephony protocol; and the at least one other multiplexer comprises another computer device that is separate from the borrower and the plurality of lenders and that communicates with the second subset of the plurality of lenders via wireless telephony protocol.

24. The system in accordance with claim 23, further comprising at least one of a hardware and software component for determining quality of service to the borrower is below a predefined level and initiating a search for the at least one multiplexer having available bandwidth when the determined quality of service is below the predefined level.

25. A method for forming a coalition, comprising:
a computer infrastructure operable to:
identify at least one multiplexer having additional bandwidth to share with an ad hoc network composed of a requesting multiplexer coupling a borrower to at least one lender;

select at least one of the at least one multiplexer having available bandwidth to form a coalition with the ad hoc network;

assign at least a portion of a task requested by the borrower to the selected at least one multiplexer having available bandwidth, wherein:

the at least one lender comprises a plurality of lenders;

the plurality of lenders comprises a first subset of the plurality of lenders and a second subset of the plurality of lenders;

the first subset of the plurality of lenders is associated with the multiplexer;

the second subset of the plurality of lenders is associated with the at least one other multiplexer;

the multiplexer comprises a computer device that is separate from the borrower and the plurality of lenders and that communicates with the borrower and the first subset of the plurality of lenders via wireless telephony protocol; and the at least one other multiplexer comprises another computer device that is separate from the borrower and the plurality of lenders and that communicates with the second subset of the plurality of lenders via wireless telephony protocol.

26. The method in accordance with claim 25, wherein the computer infrastructure is further operable to:
determine whether quality of service to the borrower is below a predefined standard; and
search for the at least one multiplexer having available bandwidth when the determined quality of service is below the predefined standard.

27. A computer program product comprising a computer usable medium having readable program code embodied in the medium and including at least one component to:
create an ad hoc network composed of a multiplexer coupling a borrower to at least one lender; and
form a coalition in which at least one other multiplexer is coupled to the ad hoc network to share bandwidth, wherein:

the at least one lender comprises a plurality of lenders;

the plurality of lenders comprises a first subset of the plurality of lenders and a second subset of the plurality of lenders;

the first subset of the plurality of lenders is associated with the multiplexer;

the second subset of the plurality of lenders is associated with the at least one other multiplexer;

the multiplexer comprises a computer device that is separate from the borrower and the plurality of lenders and that communicates with the borrower and the first subset of the plurality of lenders via wireless telephony protocol; and the at least one other multiplexer comprises another computer device that is separate from the borrower and the plurality of lenders and that communicates with the second subset of the plurality of lenders via wireless telephony protocol.

28. The method of claim 1, wherein the coalition comprises a parallel structure.

29. The method of claim 28, wherein the multiplexer and the at least one other multiplexer are arranged in a partner arrangement.

30. The method of claim 28, wherein the multiplexer and the at least one other multiplexer are arranged as gateways to the Internet or a designated server.

31. The method of claim 28, wherein the multiplexer does not monitor the performance of the at least one other multiplexer.

32. The method of claim 19, further comprising inviting the at least one other multiplexer to form the coalition.

33. The method of claim 1, wherein the at least one other multiplexer, having additional bandwidth, searches for multiplexers seeking additional bandwidth.

34. The method of claim 33, further comprising inviting the at least one other multiplexer to form the coalition.

35. The method of claim 1, wherein the steps of claim 1 are provided by a service provider on a fee and/or subscription basis.

36. The method of claim 1, wherein a service provider at least one of creates, deploys, maintains, supports an infrastructure for implementing the steps of claim 1.

37. The system in accordance with claim 20, wherein the multiplexer and the at least one other multiplexer are arranged in a parallel structure.

38. The system in accordance with claim 37, wherein the at least one other multiplexer is structured and arranged as a gateway to at least one of the Internet and a designated server.

* * * * *